(12) United States Patent (10) Patent No.: US 12,673,515 B2

Ha et al. (45) Date of Patent: Jul. 7, 2026

(54) WHEEL ASSEMBLY

(71) Applicants: HYUNDAI MOTOR COMPANY, Seoul (KR); Kia Corporation, Seoul (KR)

(72) Inventors: Ji Woo Ha, Suwon-si (KR); Hun Keon Ko, Anyang-si (KR); Kyoung Min Kim, Seoul (KR); Hyeon Sik Shin, Hwaseong-si (KR); Tae Yu Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 348 days.

(21) Appl. No.: 18/455,105

(22) Filed: Aug. 24, 2023

(65) Prior Publication Data

US 2024/0239136 A1 Jul. 18, 2024

(30) Foreign Application Priority Data

Jan. 17, 2023 (KR) ........................ 10-2023-0006846

(51) Int. Cl.
B60B 19/00 (2006.01)

(52) U.S. Cl.
CPC ........ B60B 19/00 (2013.01); B60B 2900/551 (2013.01)

(58) Field of Classification Search
CPC ... B29B 2900/551; B60B 19/02; B60B 19/04; B60B 1/0269; B62D 57/02; B25J 5/007; F16H 21/12
See application file for complete search history.

(56) References Cited

U.S. PATENT DOCUMENTS

| | | | | |
|---|---|---|---|---|
| 1,524,373 | A * | 1/1925 | Vandenberg | .............. B60B 9/28 152/15 |
| 5,492,390 | A * | 2/1996 | Kugelmann, Sr. | ...... B60B 19/00 301/5.1 |
| 7,380,618 | B2 * | 6/2008 | Gunderson | ........ B62D 49/0635 180/7.1 |
| 7,503,567 | B2 | 3/2009 | Frankie | |
| 7,896,360 | B2 | 3/2011 | Buma | |

(Continued)

FOREIGN PATENT DOCUMENTS

| | | | | |
|---|---|---|---|---|
| CN | 2461792 | Y * | 11/2001 | ............. B60B 19/04 |
| CN | 110126544 | A * | 8/2019 | ............. B60B 19/00 |

(Continued)

OTHER PUBLICATIONS

Office Action in U.S. Appl. No. 18/134,288, mailed on Sep. 11, 2025, 15 pages.

*Primary Examiner* — S. Joseph Morano
*Assistant Examiner* — Eva L Comino
(74) *Attorney, Agent, or Firm* — Fish & Richardson P.C.

(57) ABSTRACT

Disclosed is a wheel assembly including a driving rotation part being rotatable about a driving rotation axis that is a rotation axis that extends in one direction, and a variable rotation part being rotatable about a variable rotation axis that is an imaginary rotation axis, of which a relative location to the driving rotation axis is variable, and being movable relative to the driving rotation part along a direction that is not parallel to the one direction, wherein a relative location of the variable rotation axis to the driving rotation axis is variable when the variable rotation part is moved relative to the driving rotation part.

14 Claims, 17 Drawing Sheets

(56) References Cited

U.S. PATENT DOCUMENTS

| | | | |
|---|---|---|---|
| 8,172,026 B2 | 5/2012 | Yamazaki | |
| 8,307,923 B2 | 11/2012 | Lin et al. | |
| 9,757,978 B1 | 9/2017 | Emigh | |
| 9,878,576 B2 | 1/2018 | Hein | |
| 9,909,633 B2 | 3/2018 | Tanahashi et al. | |
| 11,155,131 B1* | 10/2021 | Droznin | B60B 15/263 |
| 2004/0135326 A1 | 7/2004 | Palmers et al. | |
| 2008/0288128 A1* | 11/2008 | Gunderson | B62D 49/0635 |
| | | | 701/1 |
| 2010/0147101 A1 | 6/2010 | Yamazaki | |
| 2010/0164189 A1 | 7/2010 | Buma | |
| 2013/0340902 A1* | 12/2013 | Kemeny | B60B 9/26 |
| | | | 152/1 |
| 2014/0265536 A1* | 9/2014 | Hein | B60B 19/04 |
| | | | 301/91 |
| 2016/0230824 A1 | 8/2016 | Tanahashi et al. | |
| 2017/0349003 A1* | 12/2017 | Joso | B60G 13/04 |
| 2018/0022148 A1* | 1/2018 | Lin | B60B 1/006 |
| | | | 152/5 |
| 2018/0073600 A1* | 3/2018 | Lippman | F16H 3/54 |
| 2018/0257429 A1* | 9/2018 | Fourdrinier | B60B 25/02 |
| 2019/0092091 A1* | 3/2019 | Daniels | B60G 3/00 |
| 2020/0292004 A1* | 9/2020 | Lee | F16D 3/04 |
| 2021/0323346 A1* | 10/2021 | Lee | B60B 19/04 |
| 2021/0354508 A1* | 11/2021 | Flick | B60B 27/0068 |
| 2022/0168161 A1* | 6/2022 | Ko | B60B 9/26 |
| 2022/0379980 A1* | 12/2022 | Choi | B62D 61/12 |
| 2022/0388339 A1* | 12/2022 | Jo | B60B 9/26 |

FOREIGN PATENT DOCUMENTS

| | | | | | |
|---|---|---|---|---|---|
| CN | 107856474 B | * | 9/2019 | | B60B 19/02 |
| CN | 110843414 A | * | 2/2020 | | B62D 57/02 |
| CN | 110901298 | | 9/2022 | | |
| FR | 3041284 A1 | * | 3/2017 | | B60B 25/02 |
| JP | 2018531843 A | * | 11/2018 | | B60B 25/02 |
| JP | 2022085844 A | * | 6/2022 | | A61G 5/06 |
| KR | 10-2003-0087639 | | 11/2003 | | |
| KR | 10-2008-0083708 | | 9/2008 | | |
| KR | 10-2009-0092323 | | 8/2009 | | |
| KR | 10-2013-0037808 | | 4/2013 | | |
| KR | 10-2015-0075574 | | 7/2015 | | |
| KR | 10-2015-0102886 | | 9/2015 | | |
| KR | 10-2016-0098078 | | 8/2016 | | |
| KR | 10-2016-0129248 A | | 11/2016 | | |
| KR | 10-2016-0131132 A | | 11/2016 | | |
| KR | 20160131132 A | * | 11/2016 | | B60B 19/00 |
| KR | 10-2017-0083854 | | 7/2017 | | |
| KR | 10-2018-0126576 | | 11/2018 | | |
| KR | 10-2278493 | | 7/2021 | | |
| KR | 10-2422354 | | 7/2022 | | |
| KR | 102422354 B1 | * | 7/2022 | | A61G 5/041 |
| RU | 145668 U1 | * | 9/2014 | | |

* cited by examiner

WHEEL ASSEMBLY

CROSS-REFERENCE TO RELATED APPLICATION

This application claims the benefit of priority to Korean Patent Application No. 10-2023-0006846, filed in the Korean Intellectual Property Office on Jan. 17, 2023, the entire contents of which are incorporated herein by reference.

TECHNICAL FIELD

The present disclosure relates to a wheel assembly.

BACKGROUND

In general, robots largely include a 'leg' type robot, by which a walk is allowed by using a structure in a leg form, and a 'wheel' type robot, by which a travel is allowed by using wheels. The leg type robot may easily overcome an environment, such as stairs or tough areas, but is slow on a flat ground surface and has a low energy use efficiency. Furthermore, the wheel type robot is rapid in a flat ground surface and has a high energy use efficiency, but has a significantly low travel performance in an environment, such as stairs or tough areas.

In recent years, to supplement disadvantages of the leg type robot and disadvantages of the wheel type robot, a robot equipped with a wheel assembly, in a form, in which advantages of two types of robots are combined, has been developed. For the wheel assembly equipped in the conventional robot, studies on a scheme for overcome an obstacle, such as a stair, by manufacturing the wheel assembly in a first form, in which a portion of a wheel is fixed to a structure in a leg form equipped in the leg type robot or manufacturing the wheel assembly in a second form, in which a shape of a wheel provided in the wheel type robot is temporarily deformed, have been made.

However, the first form has a restriction in a size of the wheel attached to the structure in the leg form. Furthermore, because the shape of the wheel is temporarily deformed in correspondence to a shape of an obstacle, such as a stair, in the second form, the robot in the second form cannot pass an obstacle formed to be relatively high.

SUMMARY

The present disclosure has been made to solve the above-mentioned problems occurring in the prior art while advantages achieved by the prior art are maintained intact.

An aspect of the present disclosure provides a wheel assembly that also allows a walk for allowing a rapid travel on a flat ground surface and easy passing of an obstacle by providing a new form of a wheel assembly, in which advantages of a leg type robot and a wheel type robot are combined.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a wheel assembly includes a driving rotation part being rotatable about a driving rotation axis that is a rotation axis that extends in one direction, and a variable rotation part being rotatable about a variable rotation axis that is an imaginary rotation axis, of which a relative location to the driving rotation axis is variable, and being movable relative to the driving rotation part along a direction that is not parallel to the one direction, wherein a relative location of the variable rotation axis to the driving rotation axis is variable when the variable rotation part is moved relative to the driving rotation part.

Furthermore, the variable rotation axis may extend along the one direction to overlap the driving rotation axis or to be spaced apart from the driving rotation axis.

Furthermore, the variable rotation part may be movable relative to the driving rotation part along a relative movement direction that is a direction that is perpendicular to the one direction.

Furthermore, the wheel assembly may further include a rotation driving part that rotates the driving rotation part along the driving rotation axis, and a variable driving part that moves the variable rotation part relative to the driving rotation part along the relative movement direction.

Furthermore, the variable rotation part may include a power transmission part that provides the variable rotation axis and receive power from the variable driving part, the variable driving part may include a variable motor that provides a motor rotation axis that is a rotation axis that extends in the one direction, a first variable link connected to the variable motor to be rotatable, and a second variable link connected to the power transmission part to be rotatable, and the first variable link and the second variable link may be connected to each other to be rotatable relative to each other.

Furthermore, the first variable link may include a first end being rotatable about the motor rotation axis when the variable motor is driven, and a second end being rotatable about a motor rotation center that is a rotation center that extends along the motor rotation axis, the second variable link may include a third end being rotatable about the variable rotation axis when the variable rotation part is moved relative to the driving rotation part, and a fourth end connected to the second end to be rotatable relative to each other, and being rotatable about a variable rotation center that is an imaginary rotation center that extends along the variable rotation axis, and the first end and the third end may be rotatable relative to each other about an end rotation center that is an imaginary rotation center that extends in the one direction in an area, in which the second end and the fourth end are connected to each other.

Furthermore, the variable driving part may include a first variable driving part and a second variable driving part being driven independently from each other, and of which relative locations to the rotation driving part are fixed.

Furthermore, the driving rotation part may include a guide unit extending in a driving radial direction that is a direction that is perpendicular to the driving rotation axis, and that guides movement of the variable rotation part along the driving radial direction when the variable rotation part is moved relative to the driving rotation part.

Furthermore, the variable rotation part may include a variable disk being rotatable about the variable rotation axis and a spoke unit connected to the variable disk, the guide unit may include a cylinder having a cylinder hole, into which the spoke unit is inserted, and which extends in the driving radial direction, and the spoke unit may be moved along the cylinder hole with respect to the cylinder when the variable rotation part is moved relative to the driving rotation part.

Furthermore, a plurality of spoke units may be provided, and are arranged in the variable disk along a variable circumferential direction that is a direction, in which the variable disk is rotated, the driving rotation part may further include an outer ring part having an annular shape that surrounds the driving rotation axis, and a plurality of cylinders may be provided on an inner peripheral surface of the outer ring part to be arranged along a driving circumferential direction that is a direction, in which the driving rotation part is rotated.

Furthermore, when the variable rotation part is in a spacing state, in which the variable rotation axis and the driving rotation axis are spaced apart from each other, some of the plurality of spoke units may protrude from the outer ring part to an outer side in the driving radial direction.

Furthermore, when the plurality of cylinders are arranged along the driving circumferential direction such that a cylinder circumferential angle that is a specific circumferential angle is formed between arbitrary two adjacent cylinders, a spoke circumferential angle that is a circumferential angle defined by an outer end of each of, among the plurality of spoke units, arbitrary two adjacent spoke units, in a variable radial direction may be the same as the cylinder circumferential angle when a direction that is perpendicular to the variable rotation axis is the variable radial direction.

Furthermore, the spoke unit may include a spoke inserted into the cylinder hole and being movable in the driving radial direction relative to the cylinder, and a spoke link, one end of which is connected to the variable disk, and an opposite end of which is connected to the spoke to be rotatable.

Furthermore, a plurality of spoke units may be provided, the plurality of spoke units may include a first spoke unit and a second spoke unit, one end of a first spoke link that is a spoke link of the first spoke unit may be connected to the variable disk to be fixed, and one end of a second spoke link that is a spoke link of the second spoke unit may be connected to the variable disk to be rotatable.

Furthermore, one first spoke unit may be provided, and a plurality of second spoke units may be provided.

Furthermore, the driving rotation part may further include a driving body being rotatable about the driving rotation axis, the guide unit may include a spoke connected to the driving body and extending along the driving radial direction, the variable rotation part may include a variable disk being rotatable about the variable rotation axis and a cylinder unit connected to the variable disk, the cylinder unit may include a cylinder having a cylinder hole, into which the spoke is inserted, and which extends in the driving radial direction, and the cylinder may be moved along the driving radial direction with respect to the spoke when the variable rotation part is moved relative to the driving rotation part.

Furthermore, a plurality of cylinders may be provided, and may be arranged in the variable disk along a variable circumferential direction that is a direction, in which the variable disk is rotated, and a plurality of spokes may be provided on an outer peripheral surface of the driving body to be arranged along a driving circumferential direction that is a direction, in which the driving rotation part is rotated.

Furthermore, the cylinder unit may further include a cylinder link, one end of which is connected to the variable disk, and an opposite end of which is connected to the cylinder to be rotatable.

Furthermore, a plurality of cylinder units may be provided, the plurality of cylinder units may include a first cylinder unit and a second cylinder unit, one end of a first cylinder link that is a cylinder link of the first cylinder unit may be connected to the variable disk to be fixed, and one end of a second cylinder link that is a cylinder link of the second cylinder unit may be connected to the variable disk to be rotatable.

Furthermore, one first cylinder unit may be provided, and a plurality of second cylinder units may be provided.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
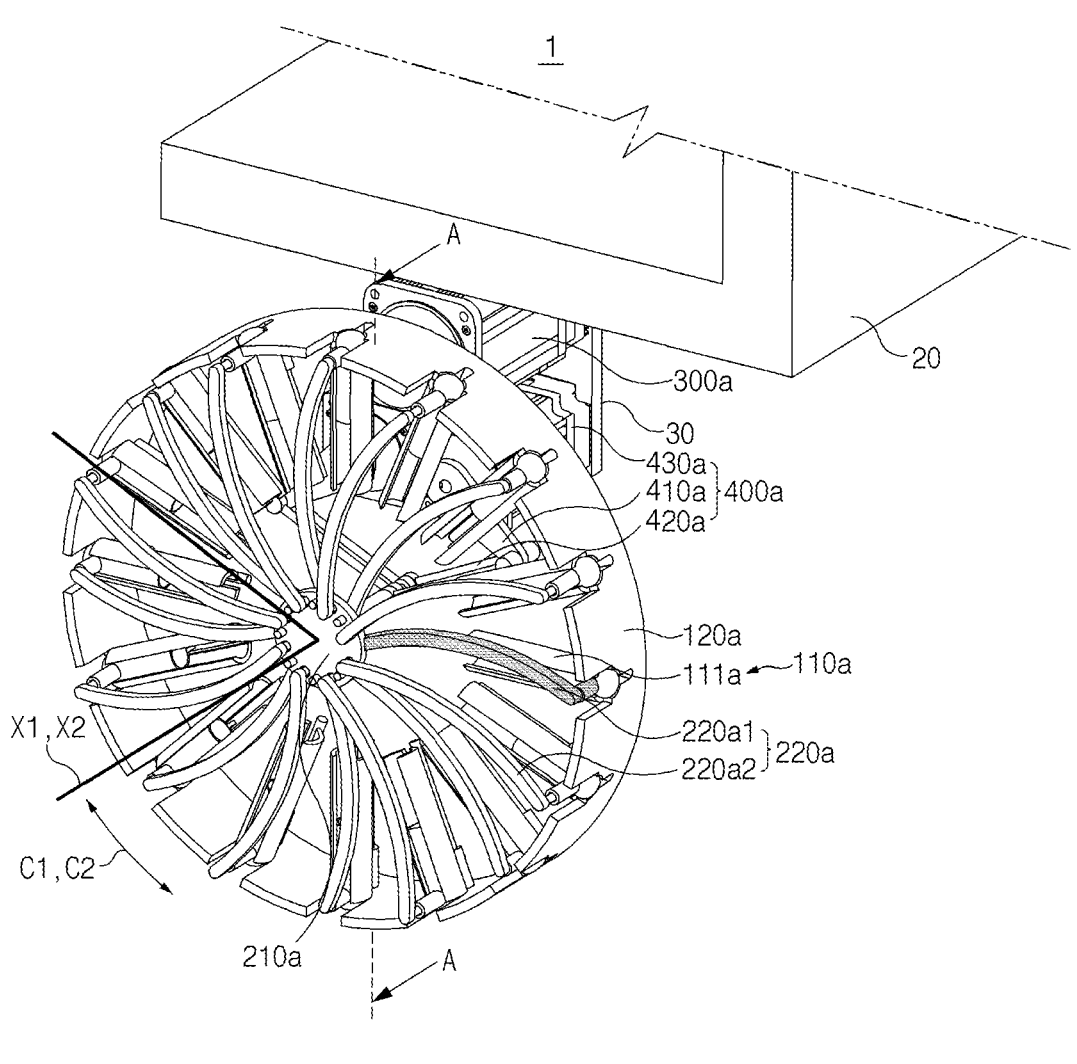
FIG. 1 is a perspective view of a robot according to a first implementation of the present disclosure.
Figure 2:
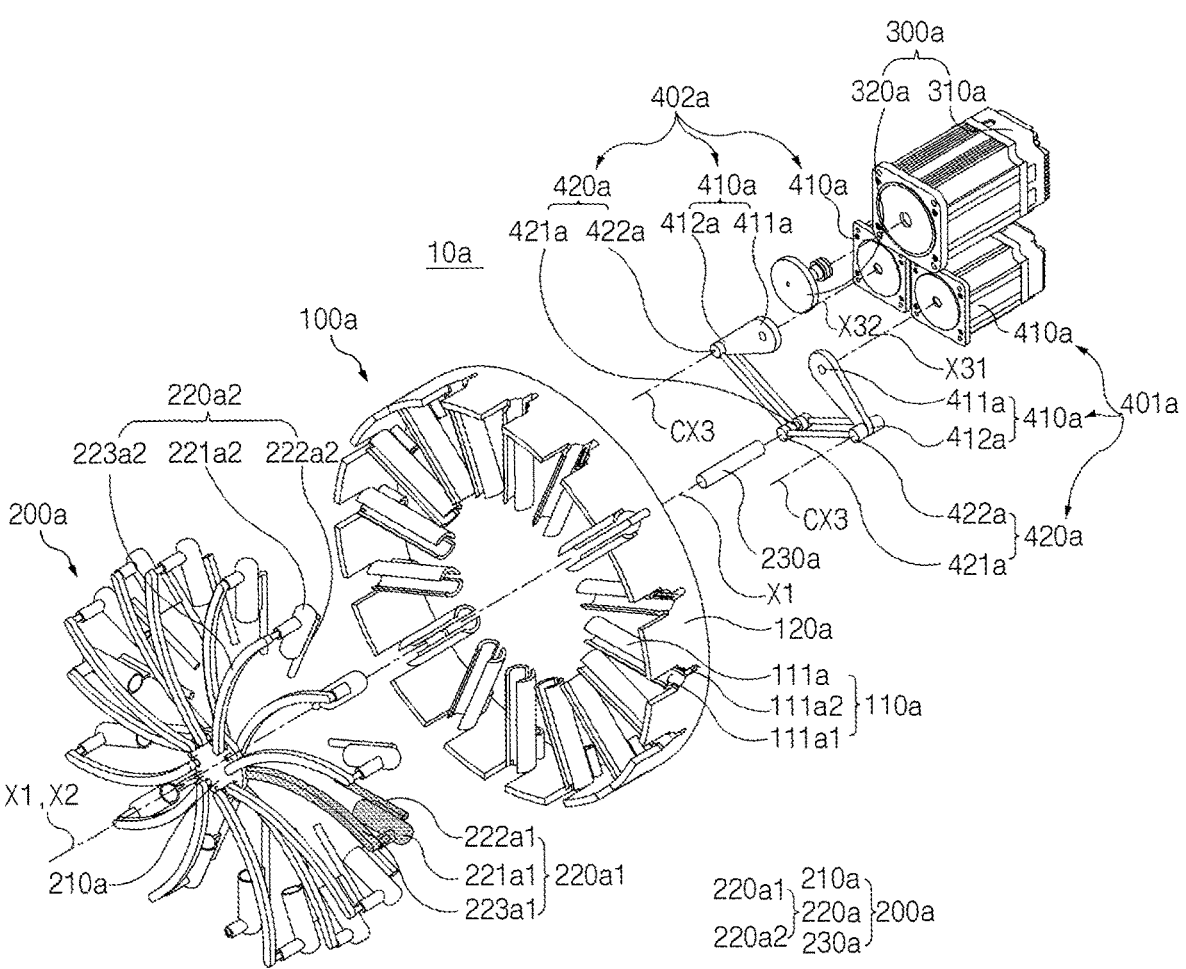
FIG. 2 is an exploded perspective view of a wheel assembly according to a first implementation of the present disclosure.

Hereinafter, some implementations of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, "A", "B", (a), (b) or the like may be used herein when describing components of the present disclosure. The terms are provided only to distinguish the components from other components, and the essences, sequences, orders, and the like of the components are not limited by the terms.

Hereinafter, a robot 1 according to the present disclosure will be described with reference to the drawings.

The robot 1 according to the present disclosure may travel on a ground surface, and may be moved to a targeted location through the travel. A shape of the robot 1 may be deformed according to a state of the ground surface such that the robot 1 may effectively pass on the ground surface having a step, such as a stair. Furthermore, the robot 1 may realize a motion that simulates a walk of a person. The robot 1 may include a wheel assembly 10a, a seat 20, and a frame 30.

Referring to FIGS. 1 to 8, the wheel assembly 10a according to a first implementation of the present disclosure may travel to move toward a targeted location together with the frame 30 while being supported by the frame 30. The wheel assembly 10a may include a driving rotation part 100a, a variable rotation part 200a, a rotation driving part 300a, and a variable driving part 400a.

Figure 3:
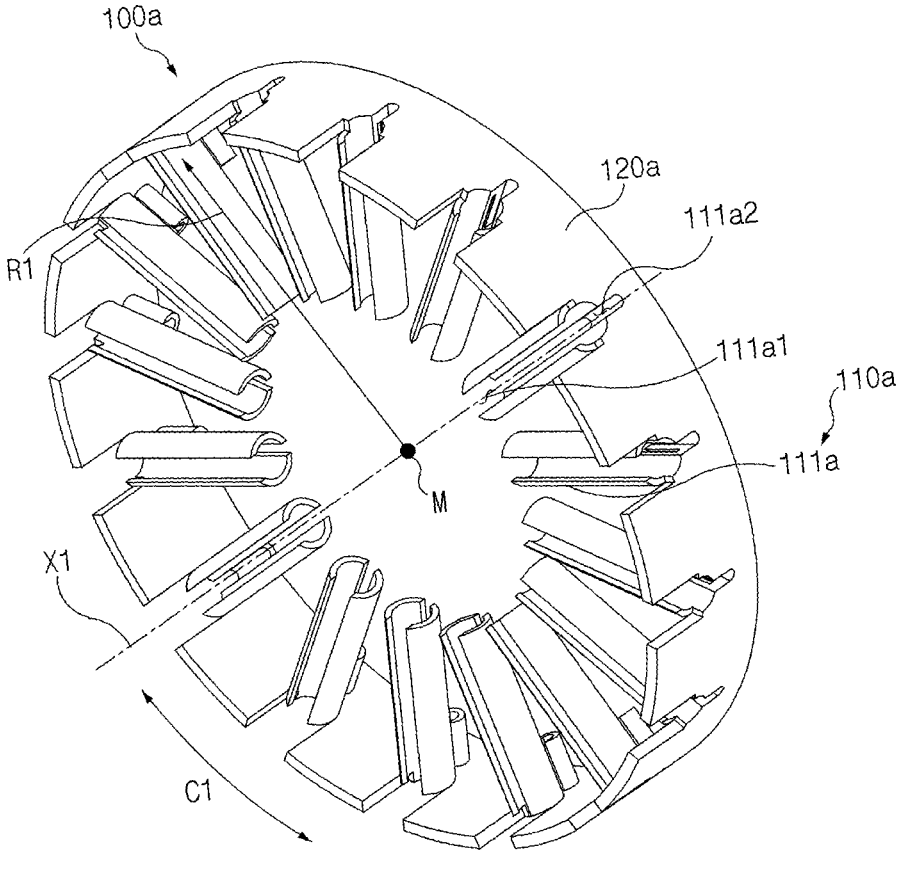
FIG. 3 is a perspective view of a driving rotation part according to a first implementation of the present disclosure.

Referring to FIG. 3, the driving rotation part 100a may be rotated about a driving rotation axis X1 that is a rotation axis that extends in one direction. The driving rotation axis X1 may be defined as an imaginary line that passes through a driving center "M" that is a center of the driving rotation part 100a. A relative location of the driving rotation axis X1 to the frame 30 may be fixed. For example, when the frame 30 is moved by a first distance in a first direction, the driving rotation part 100a may be moved by the first distance in the first direction. The driving rotation part 100a may be supported by the frame 30. The driving rotation part 100a may include a guide unit 110a and an outer ring part 120a.

The guide unit 110a may guide movement of the variable rotation part 200a. The guide unit 110a may include a cylinder 111a. The cylinder 111a may support the variable rotation part 200a. The cylinder 111a may have a shape that surrounds a spoke 221a that will be described below. A cylinder hole 111a1 and a separation preventing hole 111a2 may be formed in the cylinder 111a.

A portion of the variable rotation part 200a may be inserted into the cylinder hole 111a1. For example, the spoke 221a that will be described below may be inserted into the cylinder hole 111a1. As a more detailed example, the spoke 221a may be moved along a direction, in which the cylinder hole 111a1 extends, in a state, in which the spoke 221a is inserted into the cylinder hole 111a1. The cylinder hole 111a1 may extend along a driving radial direction R1. The driving radial direction R1 may be defined as a direction that is perpendicular to the one direction and faces the outer ring part 120a from the driving center "M".

Furthermore, the separation preventing hole 111a2 may prevent or otherwise restrict a movement path of the spoke 221a from deviating in a direction that is not parallel to the driving radial direction R1. For example, even in an insertion release state that deviates from an insertion state, in which the spoke 221a is inserted into the cylinder hole 111a1, the separation preventing hole 111a2 may guide movement of the spoke 221a such that the spoke 221a is moved along the driving radial direction R1. The insertion state may be defined as a state, in which at least a portion of the spoke 221a is inserted into the cylinder hole 111a1. Furthermore, the insertion release state may be defined as a state, in which the spoke 221a is spaced apart from the cylinder hole 111a1 in the driving radial direction R1. When the spoke 221a is in the insertion state, a movement path of the spoke 221a may be determined by the cylinder hole 111a1. Furthermore, when the spoke 221a is in the insertion release state, the movement path of the spoke 221a may be determined by the separation preventing hole 111a2.

A separation preventing member 222a that will be described below may be inserted into the separation preventing hole 111a2. The separation preventing member 222a may be moved along a direction, in which the separation preventing hole 111a2 extends. The separation preventing hole 111a2 may extend along the driving radial direction R1. Furthermore, the separation preventing hole 111a2 may be disposed on a side that is close to a periphery of the separation preventing hole 111a2. For example, when the cylinder hole 111a1 is viewed in the driving radial direction R1, the separation preventing hole 111a2 may be disposed to be adjacent to the periphery of the cylinder hole 111a1. The separation preventing hole 111a2 may be communicated with the cylinder hole 111a1.

Furthermore, a plurality of cylinders 111a may be provided. The plurality of cylinders 111a may be arranged on an inner peripheral surface of the outer ring part 120a to be spaced apart from each other in the driving radial direction R1. An outer circle that is an imaginary circle that passes through outer ends of the plurality of cylinders 111a in the driving radial direction R1 may be larger than an inner circle that is an imaginary circle that passes through inner ends of the plurality of cylinders 111a in the driving radial direction R1. In other words, a radius of the outer circle, which is a spacing distance between the driving center "M" and the outer circle in the driving radial direction R1, may be larger than a radius of the inner circle, which is a spacing distance between the driving center "M" and the inner circle in the driving radial direction R1.

The outer ring part 120a may be connected to outer ends of the plurality of cylinders 111a in the driving radial direction R1. The outer ring part 120a, for example, may be integrally formed with the plurality of cylinders 111a. The outer ring part 120a may have an annular ring shape, a center of which is the driving center "M". For example, when the outer ring part 120a is viewed in one direction, the outer ring part 120a may have a circular shape that extends along a driving circumferential direction C1 that is a direction, in which the driving rotation part 100a is rotated.

Figure 4:
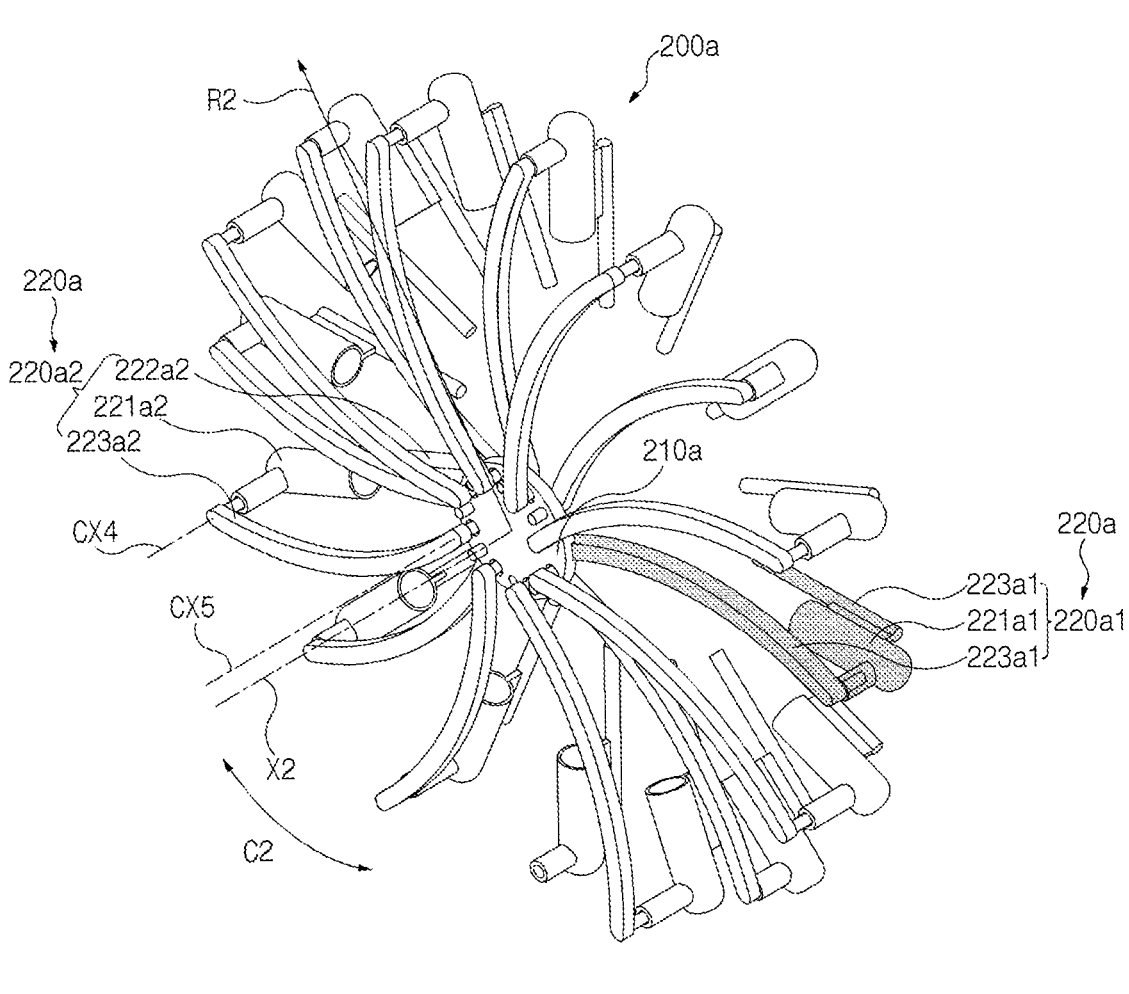
FIG. 4 is a perspective view of a variable rotation part according to a first implementation of the present disclosure.

The wheel assembly 10a may further include a fixing part. The fixing part may fix a relative location of the outer ring part 120a to the frame 30 of the driving center "M". In other words, the fixing part may restrict the driving center "M" of the outer ring part 120a from being moved with respect to the frame 30. Through the fixing part, the outer ring part 120a may be rotated about the driving rotation axis X1, and a relative location thereof to the frame 30 may be fixed. The fixing part, for example, may include one or more bearings that are attached to one or more of an inner peripheral surface and an outer peripheral surface of the outer ring part 120a. Referring to FIG. 4, the variable rotation part 200a may be moved relative to the driving rotation part 100a. For example, the variable rotation part 200a may be moved with respect to the driving rotation part 100a along a relative movement direction that deviates from the one direction. The relative movement direction, for example, may be a direction that is perpendicular to the one direction. In a more detailed example, it may be understood that, when the one direction is a leftward/rightward direction as an example, the relative movement direction is a concept including directions of a forward/rearward vector, an upward/downward vector, and all vectors that may be defined through combination thereof. However, this is a simple example, and it may be understood that the one direction of the present disclosure is not limited to the leftward/rightward direction and may be the leftward/rightward direction and an arbitrary direction that is a direction that deviates from the leftward/rightward direction.

Furthermore, the variable rotation part 200a may be rotated through rotation of the driving rotation part 100a. For example, the variable rotation part 200a may be rotated together with the driving rotation part 100a while being supported by the driving rotation part 100a. The variable rotation part 200a may be rotated about a variable rotation axis X2 that is an imaginary rotation axis, of which a relative location to the driving rotation axis X1 may be changed. A relative location of the variable rotation axis X2 to the frame 30 may be changed. In this regard, it may be understood that the 'imaginary rotation axis' in the specification is an imaginary line, of which a relative location to the frame 30 is changed.

The variable rotation axis X2 may extend along the one direction. Furthermore, when the variable rotation part 200a is moved relative to the driving rotation part 100a, the variable rotation axis X2 may overlap the driving rotation axis X1 or be spaced apart from the driving rotation axis X1. Furthermore, the variable rotation part 200a may be in any one of an overlapping state, in which the variable rotation axis X2 and the driving rotation axis X1 overlap each other, and a spacing state, in which the variable rotation axis X2 and the driving rotation axis X1 are spaced apart from each other.

When the variable rotation part 200a is in the overlapping state, a repulsive force of the ground surface due to a load of the robot 1 may be applied to the driving rotation part 100a. The variable rotation part 200a may be configured to be in the overlapping state when the ground, on which the robot 1 travels, is flat. Furthermore, when the variable rotation part 200a is in the spacing state, a repulsive force of the ground surface due to a load of the robot 1 may be applied to the variable rotation part 200a. The variable rotation part 200a may be configured to be in the spacing state when the ground, on which the robot 1 travels, is stepped. In this way, through the variable rotation part 200a that may be in various states according to situations, a travel efficiency of the robot 1 may be maximized when the ground surface is flat and an obstacle to the robot may be easily overcome when a step is formed on the ground surface. The variable rotation part 200a may include a variable disk 210a, a spoke unit 220a, and a power transmission part 230a.

The variable disk 210a may be rotated about the variable rotation axis X2. The variable disk 210a may have a disk shape. A radius of the variable disk 210a may be smaller than a radius of the inner circle.

The spoke unit 220a may be connected to the variable disk 210a. The spoke unit 220a may be connected to a periphery of the variable disk 210a. Furthermore, a plurality of spoke units 220a may be provided. The plurality of spoke units 220a may be arranged at the periphery of the variable disk 210a to be spaced apart from each other along a variable circumferential direction C2. The variable circumferential direction C2 may be defined as a direction, in which the variable rotation part 200a is rotated. For example, the plurality of spoke units 220a may be alternately arranged at a periphery of the outer surface and a periphery of the inner surface of the variable disk 210a. For example, when any one of the plurality of spoke units 220a is disposed at the periphery of the outer surface of the variable disk 210a, the spoke unit 220a that is closest to the any one of the plurality of spoke units 220a may be disposed at the periphery of the inner surface of the variable disk 210a. The outer surface of the variable disk 210a may be defined as a part of the variable disk 210a, which faces an outside of the robot 1 when the variable disk 210a is viewed in the one direction. Furthermore, the inner surface of the variable disk 210a may be defined as a part of the variable disk 210a, which faces the driving rotation part 100a when the variable disk 210a is viewed in the one direction. In other words, the outer surface or the variable disk 210a may mean an opposite surface to the inner surface of the variable disk 210a. Through arrangement of the plurality of spoke units 220a, two adjacent spoke units 220a may be restricted from being interfered with each other.

Figure 7:
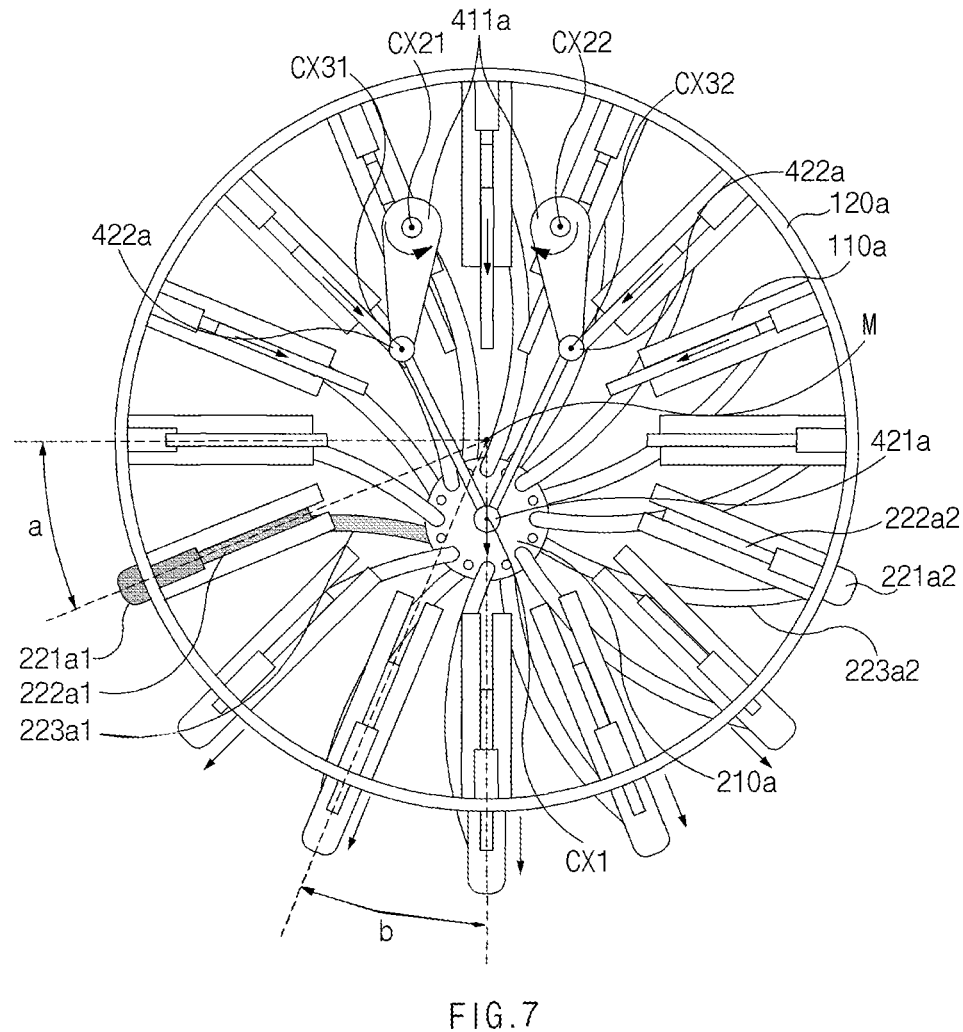
FIG. 7 is a view illustrating a state, in which the variable rotation part of FIG. 6 is moved relative to the driving rotation part.
Figure 8:
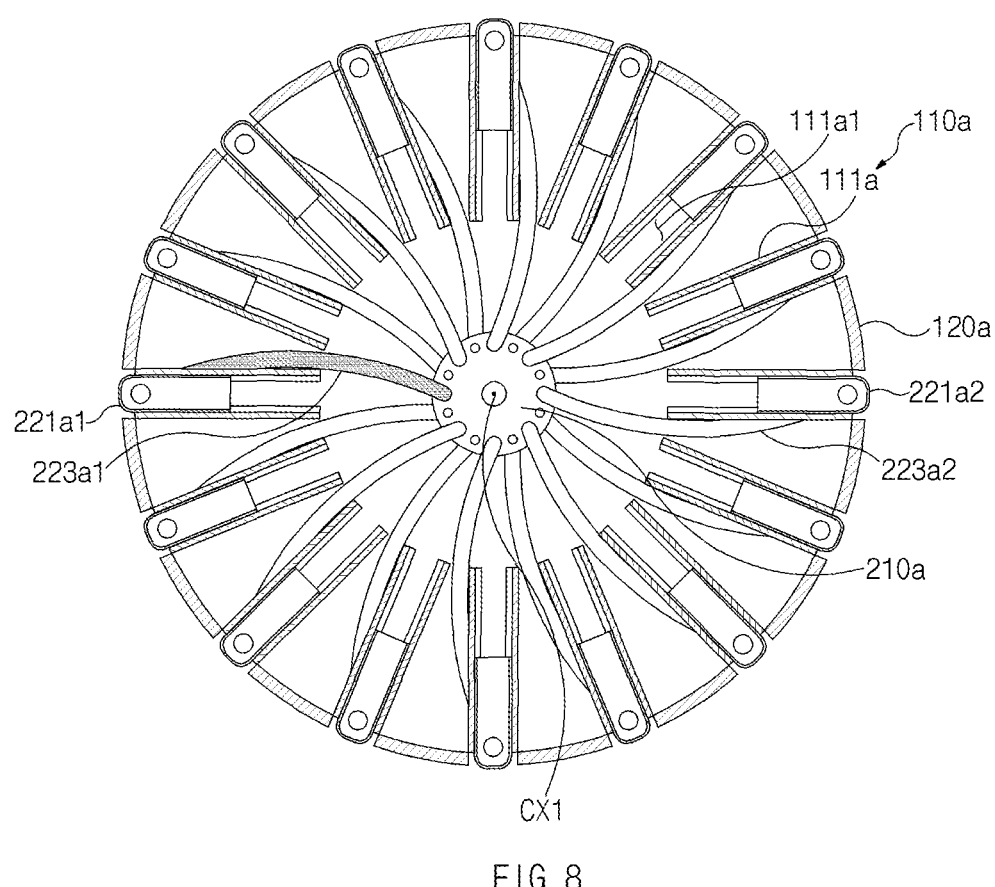
FIG. 8 is a longitudinal sectional view taken along line A-A' of FIG. 1.

Furthermore, referring to FIG. 7, a spoke circumferential angle "b" that is a circumferential angle defined by, among the plurality of spoke units 220a, arbitrary two adjacent spoke units 220a may be the same as a cylinder circumferential angle "a" defined by, among the plurality of cylinders 111a, arbitrary two adjacent cylinders 111a. The cylinder circumferential angle "a" may be defined by an angle defined by two imaginary lines that extend from two adjacent cylinders 111a in the driving radial direction R1 to the driving center "M". Furthermore, the spoke circumferential angle "b" may be defined as an angle defined by two imaginary lines that extend from two adjacent spoke units 220a in a variable radial direction R2 and pass through the driving center "M". The plurality of spoke units 220a may include a first spoke unit 220a1 and a second spoke unit 220a2.

The first spoke unit 220a1 may be connected to the variable disk 210a to be fixed. One first spoke unit 220a1 may be provided. The first spoke unit 220a1, for example, may be integrally formed with the variable disk 210a. Furthermore, the second spoke unit 220a2 may be connected to the variable disk 210a to be rotatable. A plurality of second spoke units 220a2 may be provided.

Furthermore, each of the plurality of spoke units 220a may include the spoke 221a, the separation preventing member 222a, and a spoke link 223a.

The spoke 221a may be inserted into the cylinder hole 111a1. The spoke 221a may be moved along the cylinder hole 111a1 in a state, in which the spoke 221a is inserted into the cylinder hole 111a1. In other words, the spoke 221a may reciprocate along the driving radial direction R1 with respect to the cylinder 111a. For example, the spoke 221a may be moved inwards in the driving radial direction R1 with respect to the cylinder 111a or may be moved outwards in the driving radial direction R1. An inward direction in the driving radial direction R1 is defined as a direction that becomes farther away from the driving center "M" along the driving radial direction R1, and an outward direction in the driving radial direction R1 is defined as a direction that becomes closer to the driving center "M" along the driving radial direction R1.

The spoke 221a may be connected to the spoke link 223a to be rotatable. For example, the spoke 221a and the spoke link 223a may be rotated with respect to each other. In a more detailed example, the spoke 221a may be rotated about an imaginary rotation center that extends in one direction in an area, in which the spoke 221a and the spoke link 223a are connected to each other.

For clarity, in the specification, a rotation center may mean a center axis of a revolution of a configuration having a center that is spaced apart from the rotation center, and a rotation axis may mean a center axis of a rotation of a configuration having a center that overlaps the rotation axis. Furthermore, it may be understood that the 'imaginary rotation center' in the specification mean an imaginary line, of which a relative location to the frame 30 may be changed. Furthermore, a variable rotation center CX1 that will be described below may be defined as an 'imaginary rotation center', a motor rotation center CX may be defined as a 'rotation center', end rotation centers CX31 and CX32 may be defined as 'imaginary rotation centers', a spoke rotation center CX4 may be defined as an 'imaginary rotation center', and a disk rotation center CX5 may be defined as an 'imaginary rotation center'.

Furthermore, the variable rotation center CX1 may be defined as an imaginary rotation center that extends along the variable rotation axis X2. The motor rotation centers CX21 and CX22 may be defined as rotation centers that extend along the motor rotation axis that will be described below. The end rotation centers CX31 and CX32 may be defined as imaginary rotation centers that extend on one direction in an area, in which a second end 412a and a fourth end 422a are connected to each other. The spoke rotation center CX4 may be defined as an imaginary rotation center that extends on one direction in an area, in which the spoke 221a and the spoke link 223a are connected to each other. The disk rotation center CX5 may be defined as an imaginary rotation center that extends in one direction in an area, in which the spoke link 223a and the variable disk 210a are connected to each other.

The spoke 221a may include a first spoke 221a1 and a second spoke 221a2. The first spoke 221a1 may be provided in the first spoke unit 220a1. Furthermore, the second spoke 221a2 may be provided in the second spoke unit 220a2. A description of the first spoke 221a1 and the second spoke 221a2 will be replaced by the description of the spoke 221a.

The separation preventing member 222a may be connected to a periphery of the spoke 221a. The separation preventing member 222a may extend along the variable radial direction R2. The variable radial direction R2 may be defined as a direction that is perpendicular to the variable rotation axis X2. An imaginary line that extends along the variable radial direction R2 may be perpendicular to the variable rotation axis X2. A length of the separation preventing member 222a in the variable radial direction R2 may be larger than a length of the spoke 221a in the variable radial direction R2. For example, an inner end of the separation preventing member 222a in the variable radial direction R2 may be disposed on an inner side of an inner end or the spoke 221a in the variable radial direction R2. In a more detailed example, the separation preventing member 222a may have a shape that protrudes from the inner end of the spoke 221a in the variable radial direction R2 to an inner side in the variable radial direction R2 when the variable rotation part 200a is viewed along one direction.

The separation preventing member 222a may be inserted into the separation preventing hole 111a2. The separation preventing member 222a may be supported by the cylinder 111a when the spoke 221a is in the insertion release state. For example, when the spoke 221a is in the insertion release state, the separation preventing member 222a may be in a state, in which it is inserted into the separation preventing hole 111a2. The separation preventing member 222a, for example, may be integrally formed with the spoke 221a.

The separation preventing member 222a may include a first separation preventing member 222a1 and a second separation preventing member 222a2. The first separation preventing member 222a1 may be provided in the first spoke unit 220a1. Furthermore, the second separation preventing member 222a2 may be provided in the second spoke unit 220a2. A description of the first separation preventing member 222a1 and the second separation preventing member 222a2 will be replaced by the description of the separation preventing member 222a.

The spoke link 223a may connect the variable disk 210a and the spoke 221a. For example, one end of the spoke link 223a may be connected to the variable disk 210a, and an opposite end thereof may be connected to the spoke 221a to be rotatable. The spoke link 223a may include a first spoke link 223a1 and a second spoke link 223a2.

One end of the first spoke link 223a1 may be connected to a periphery of the variable disk 210a to be fixed. An opposite end of the first spoke link 223a1 may be connected to the first spoke 221a1 to be rotatable. One end of the first spoke link 223a1 may be rotated about the spoke rotation center CX4.

One end of the second spoke link 223a2 may be connected to a periphery of the variable disk 210a to be rotatable. An opposite end of the second spoke link 223a may be rotated about the disk rotation center CX5. Furthermore, an opposite end of the second spoke link 223a2 may be connected to the second spoke 221a2 to be rotatable. An opposite end of the second spoke link 223a may be rotated about the spoke rotation center CX4.

The power transmission part 230a may transmit a driving force of the variable driving part 400a to the variable rotation part 200a when the variable driving part 400a is driven. Furthermore, the variable rotation axis X2 may be provided in the variable rotation part 200a. The power transmission part 230a may extend along a direction of the variable rotation axis X2. The power transmission part 230a may be connected to the variable disk 210a and the variable driving part 400a. For example, the power transmission part 230a may be connected to at least one of the variable disk 210a, the variable driving part 400a, or a combination thereof to be rotatable. In other words, the power transmission part 230a may transmit a driving force of the variable driving part 400a to the variable rotation part 200a regardless of rotation of the variable rotation part 200a. The power transmission part 230a may be connected to an inner surface of the variable disk 210a.

The rotation driving part 300a may provide a rotational force to the driving rotation part 100a. The rotation driving part 300a may be supported by the frame 30. The rotation driving part 300a may include a rotation motor 310a and a rotation member 320a. The rotation motor 310a may provide a rotational force to the rotation member 320a. The rotation member 320a may be adhered to an inner surface of the outer ring part 120a.

A plurality of rotation driving parts 300a, for example, may be provided. A plurality of rotation driving parts 300a may include a first rotation driving part and a second rotation driving part.

For example, the first rotation driving part and the second rotation driving part may be disposed to be symmetrical to each other with respect to the driving center "M". For example, the first rotation driving part may be adhered to an upper end of an inner peripheral surface of the outer ring part 120a, and the second rotation driving part may be adhered to a lower end of the inner peripheral surface of the outer ring part 120a. The first rotation driving part and the second rotation driving part may support the driving rotation part 100a such that a relative location of the driving center "M" to the frame 30 is fixed. In other words, the first rotation driving part and the second rotation driving part may fix a relative location of the driving rotation axis X1 to the frame 30.

The present disclosure is not limited to the above example, and the plurality of rotation driving parts 300a may be n (n>2) rotation driving parts. For example, when n rotation driving parts 300a are provided, the weight center of the n rotation driving parts 300a may be disposed to be the same as the driving center "M".

Figure 5:
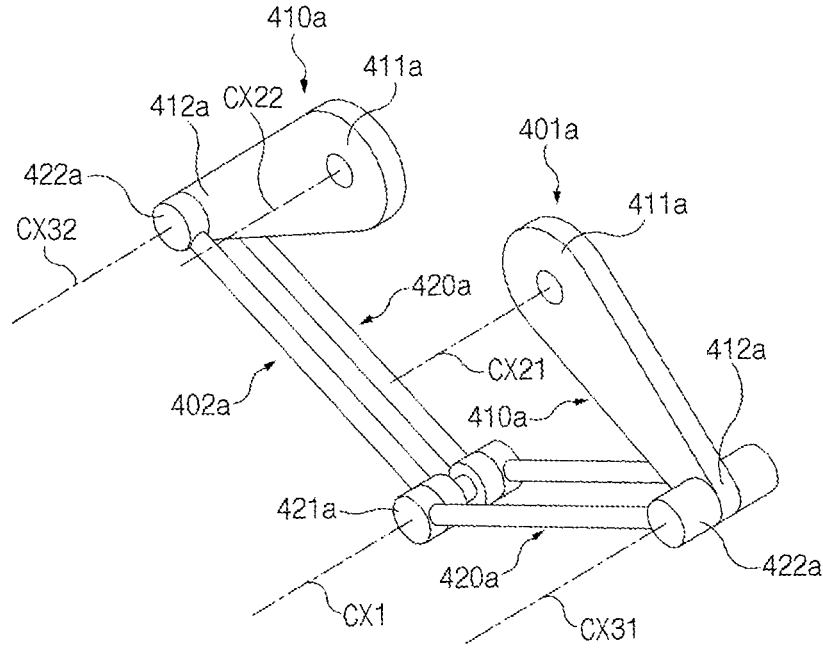
FIG. 5 is a perspective view of a variable driving part according to a first implementation of the present disclosure.

Referring to FIG. 5, the variable driving part 400a may move the variable rotation part 200a relative to the driving rotation part 100a. The variable driving part 400a may include a first variable link 410a, a second variable link 420a, and a variable motor 430. The first variable link 410a may connect the second variable link 420a and the variable motor 430. The first variable link 410a may include a first end 411a and a second end 412a.

The first end 411a may be connected to the variable motor 430 to be fixed. Furthermore, when the variable motor 430 is driven, the first end 411a may be rotated about the motor rotation axis. The motor rotation axis may be defined as an imaginary line that extends along one direction and passes through the variable motor 430.

The second end 412a may be connected to the second variable link 420a to be rotatable. The second end 412a may be rotated about the motor rotation centers CX21 and CX22 when the variable motor 430 is driven.

The second variable link 420a may connect the first variable link 410a and the power transmission part 230a. The second variable link 420a may include a third end 421a and a fourth end 422a. The third end 421a may be connected to the power transmission part 230a to be rotatable. The third end 421a may be rotated about the variable rotation axis X2. Furthermore, the first end 411a and the third end 421a may be rotated about the end rotation centers CX31 and CX32 with respect to each other.

Furthermore, the fourth end 422a may be rotated about the variable rotation center CX1. The fourth end 422a and the second end 412a may be connected to be rotatable with respect to each other. A hinge pin that provides the end rotation centers CX31 and CX32, for example, may be provided between the fourth end 422a and the second end 412a.

The variable motor 430 may provide a rotational force to the first variable link 410a. When the variable motor 430 is driven, the first variable link 410a may be rotated, and the second variable link 420a may be rotated through rotation of the first variable link 410a.

Figure 6:
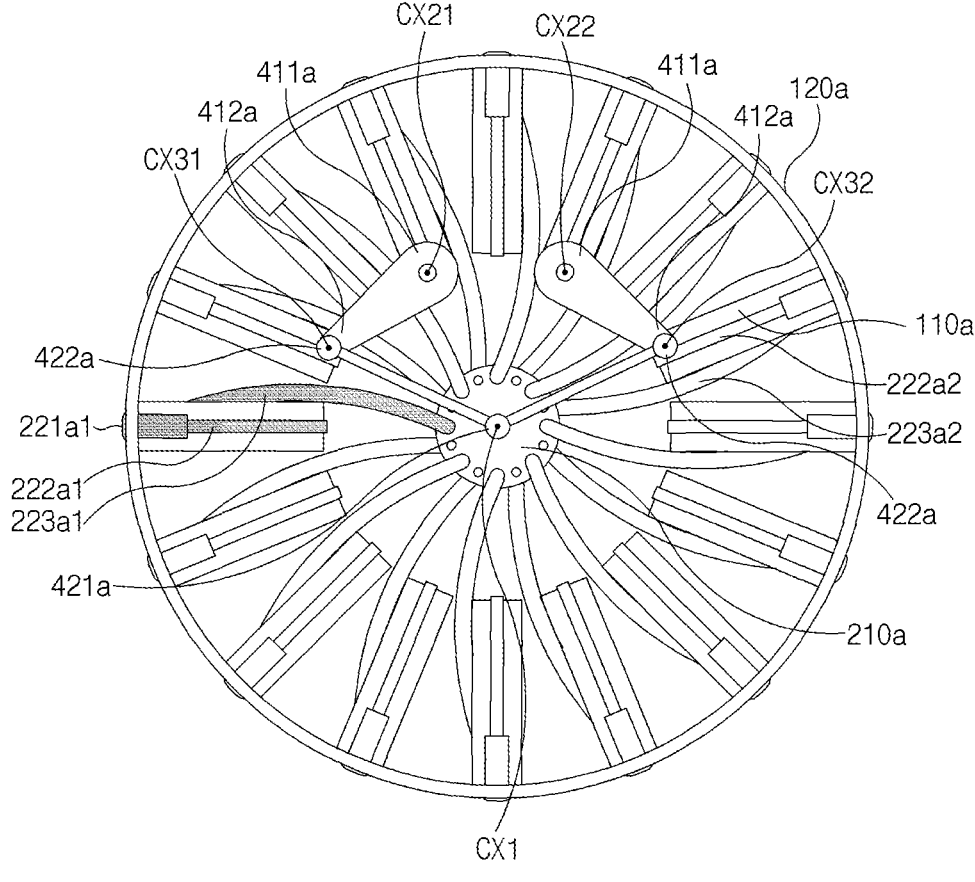
FIG. 6 is a rear view of a wheel assembly when a variable driving part is in an overlapping state according to a first implementation of the present disclosure.

Referring to FIGS. 6 and 7, a plurality of variable driving parts 400a may be provided. The plurality of variable driving parts 400a may include a first variable driving part 401a and a second variable driving part 402a. In some cases, the above-described motor rotation centers CX21 and CX22 may include a first motor rotation center CX21 and a second motor rotation center CX22. The first motor rotation center CX21 may provide a rotation center in the second end 412a of the first variable driving part 401a. Furthermore, the second motor rotation center CX22 may provide a rotation center in the second end 412a of the second variable driving part 402a. Furthermore, the end rotation centers CX31 and CX32 may include a first end rotation center CX31 and a second end rotation center CX32. The first end rotation center CX31 may provide rotation centers in the first end 411a and the third end 421a of the first variable driving part

401a. Furthermore, the second end rotation center CX32 may provide rotation centers in the first end 411a and the third end 421a of the second variable driving part 402a.

The first variable driving part 401a and the second variable driving part 402a may be driven independently. For example, when the first end 411a of the first variable driving part 401a and the first end 411a of the second variable driving part 402a are rotated in different directions, the variable rotation part 200a may be moved along the upward/downward direction. As another example, when the first end 411a of the first variable driving part 401a and the first end 411a of the second variable driving part 402a are rotated in the same direction, the variable rotation part 200a may be moved in a direction that is perpendicular to the one direction and is different from the upward/downward direction. In this way, because the first variable driving part 401a and the second variable driving part 402a may be driven independently, the variable rotation part 200a may be moved along the relative movement direction to the driving rotation part 100a. Furthermore, relative locations of the first variable driving part 401a and the second variable driving part 402a with respect to the frame 30 may be fixed.

A user or an object may be seated on the seat 20. The seat 20 may be connected to the frame 30. The driving rotation part 100a, the variable rotation part 200a, and the rotation driving part 300a may be connected to the frame 30. The frame 30 may fix relative locations of the driving rotation part 100a, the variable rotation part 200a, and the rotation driving part 300a to the frame 30.

Hereinafter, a wheel assembly 10b according to a second implementation of the present disclosure will be described with reference to FIGS. 9 to 17. In a description of the second implementation of the present disclosure, a difference from the first implementation of the present disclosure will be mainly described. The wheel assembly 10b may include the driving rotation part 100b, the variable rotation part 200b, the rotation driving part 300b, and a variable driving part 400b. The driving rotation part 100b may include a guide unit 110b and a driving body 120b.

Figure 9:
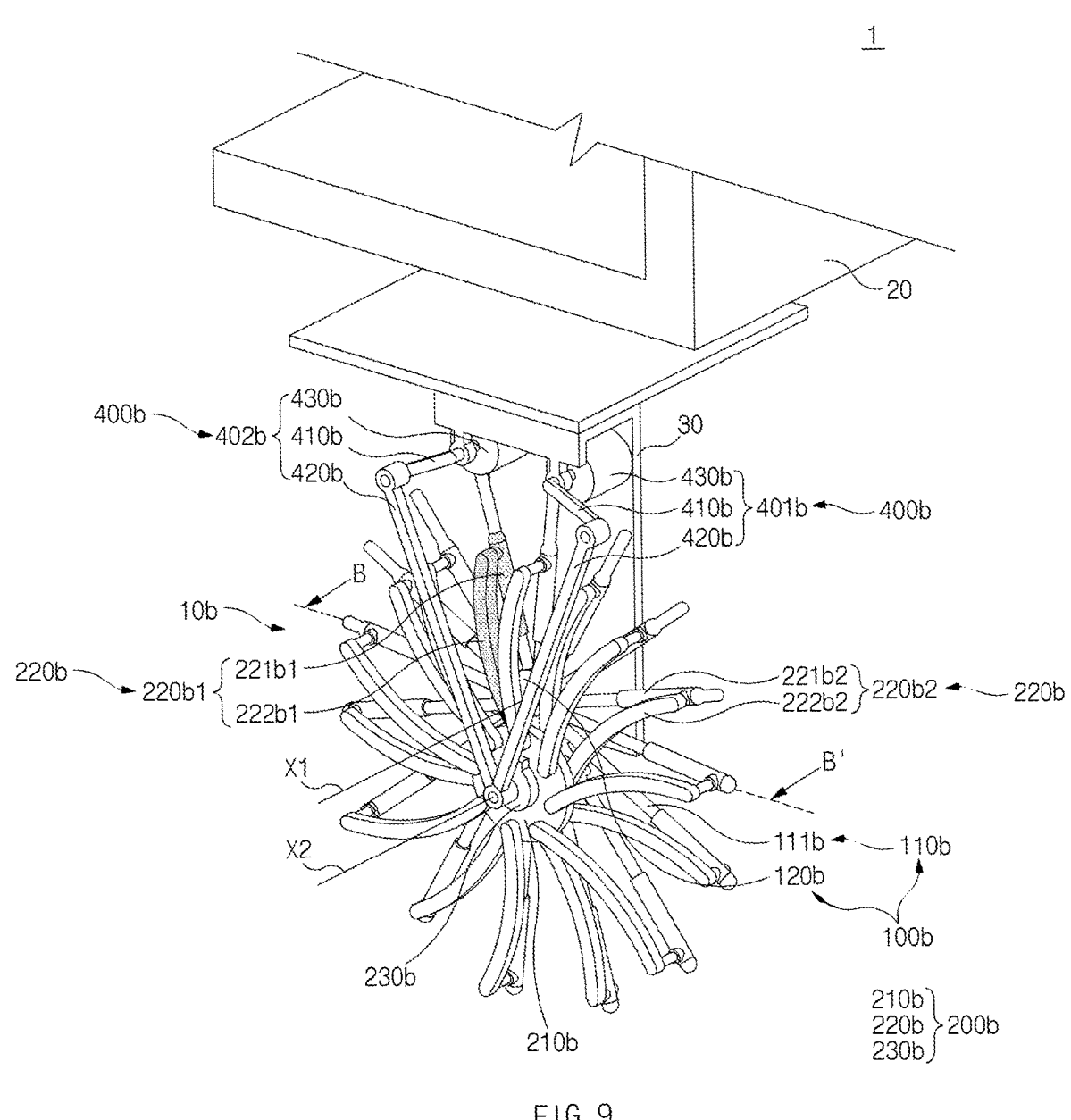
FIG. 9 is a perspective view of a robot according to a second implementation of the present disclosure.
Figure 10:
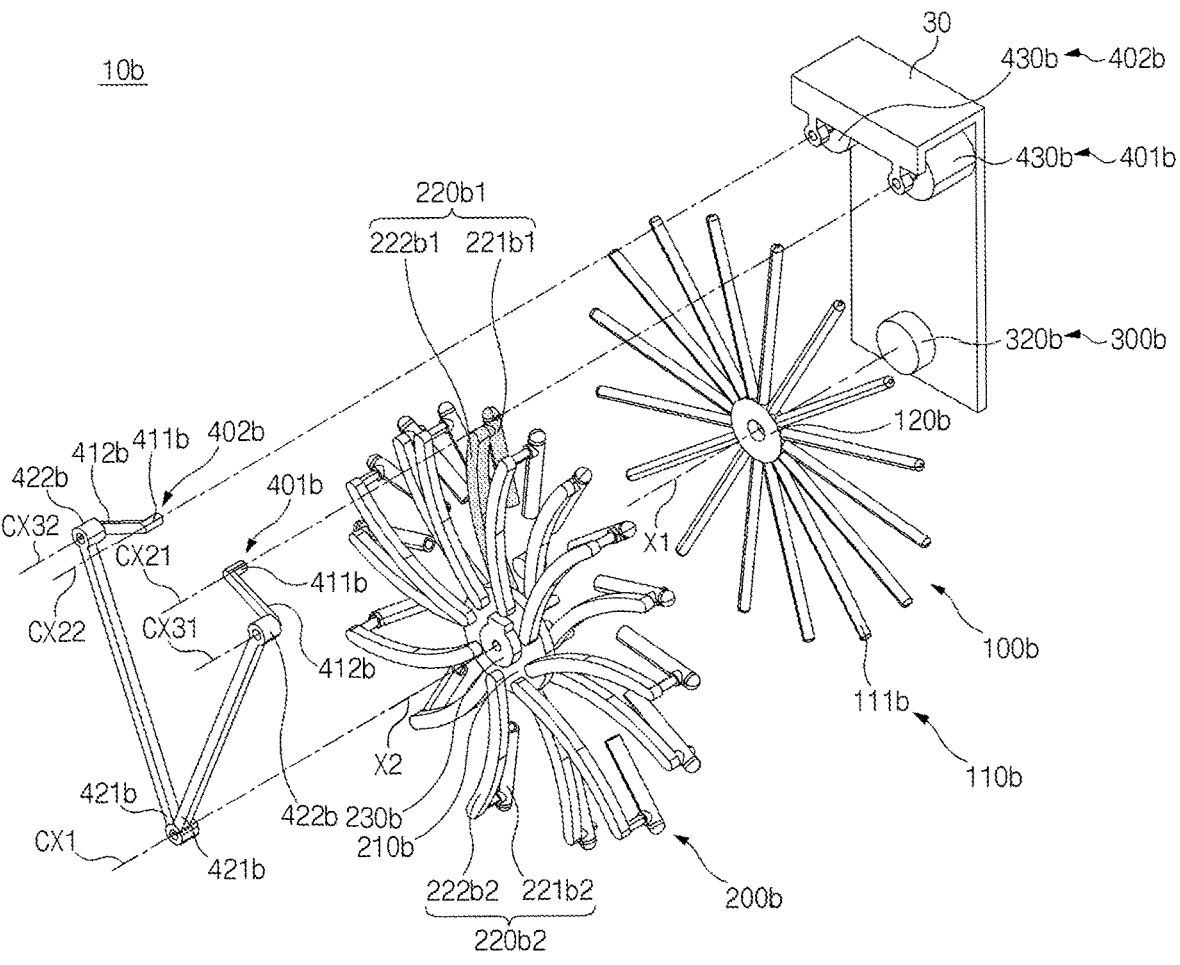
FIG. 10 is an exploded perspective view of a wheel assembly according to a second implementation of the present disclosure.
Figure 11:
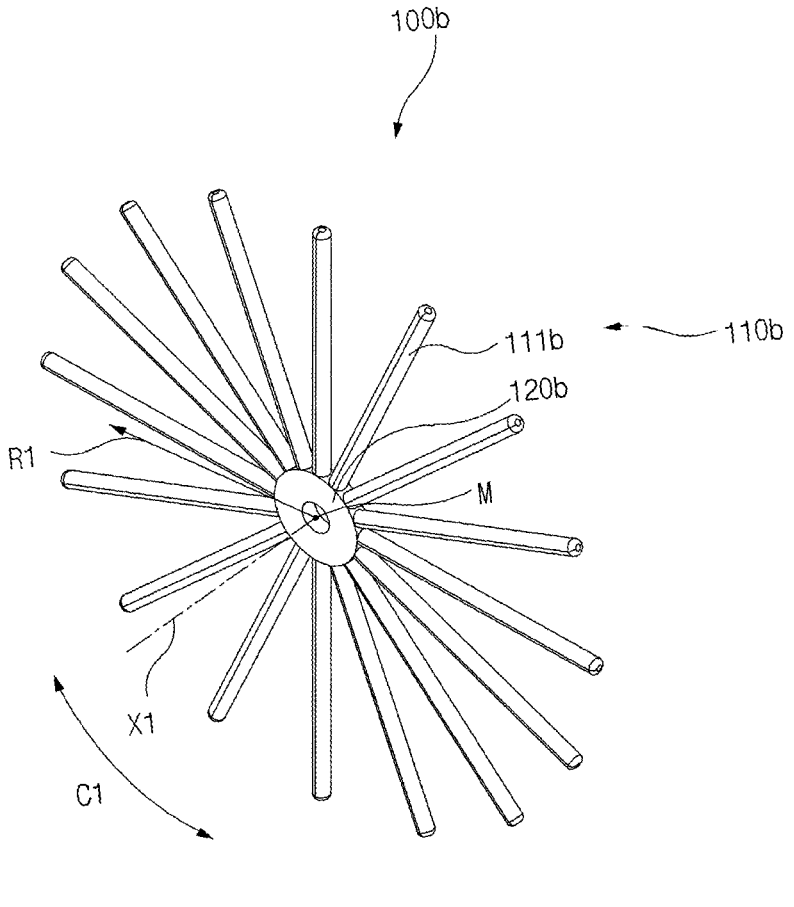
FIG. 11 is a perspective view of a driving rotation part according to a second implementation of the present disclosure.

Referring to FIGS. 9 to 11, the guide unit 110b may include a spoke 111b. The spoke 111b may guide movement of a portion of the variable rotation part 200b. For example, the spoke 111b may guide movement of a cylinder 221b that will be described below along the driving radial direction R1. The spoke 111b may support the variable rotation part 200b. A plurality of spokes 111b may be provided. The plurality of spokes 111b may be arranged on an outer peripheral surface of the driving body 120b along the driving circumferential direction C1. Furthermore, an outer circle that is an imaginary circle that passes through outer ends of the plurality of spokes 111b in the driving radial direction R1 may be larger than an inner circle that is an imaginary circle that passes through inner ends of the plurality of spokes 111b in the driving radial direction R1.

The driving body 120b may be connected to inner ends of the plurality of spokes 111b in the driving radial direction R1. The driving body 120b, for example, may be integrally formed with the plurality of spokes 111b.

Figure 12:
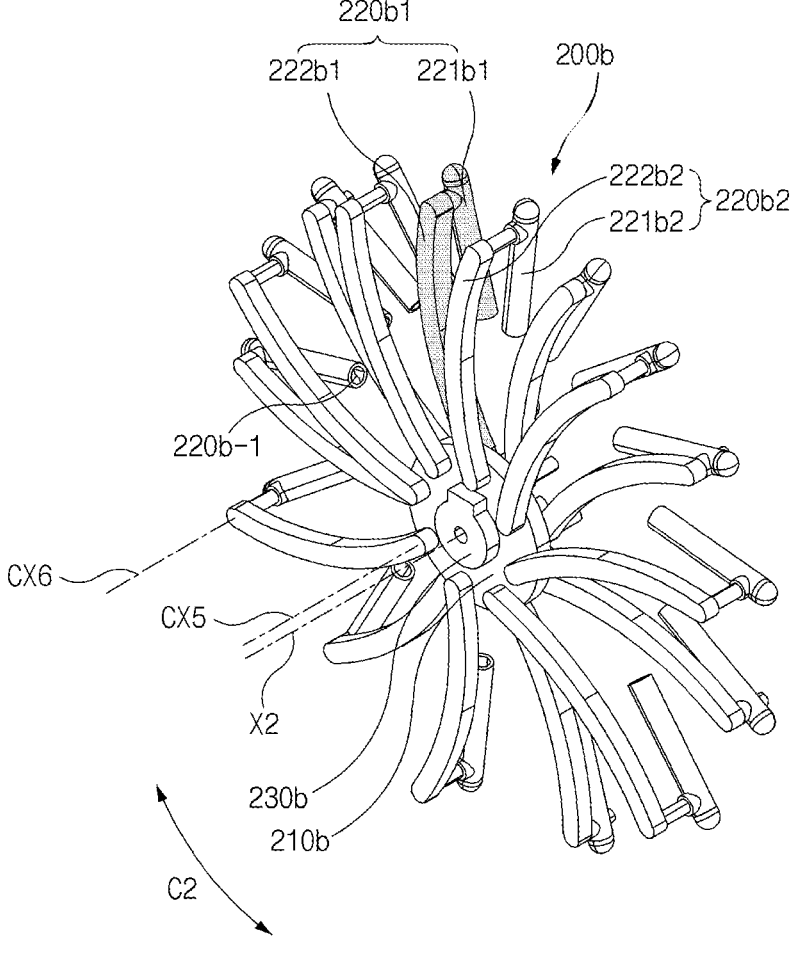
FIG. 12 is a perspective view of a variable rotation part according to a second implementation of the present disclosure.
Figure 13:
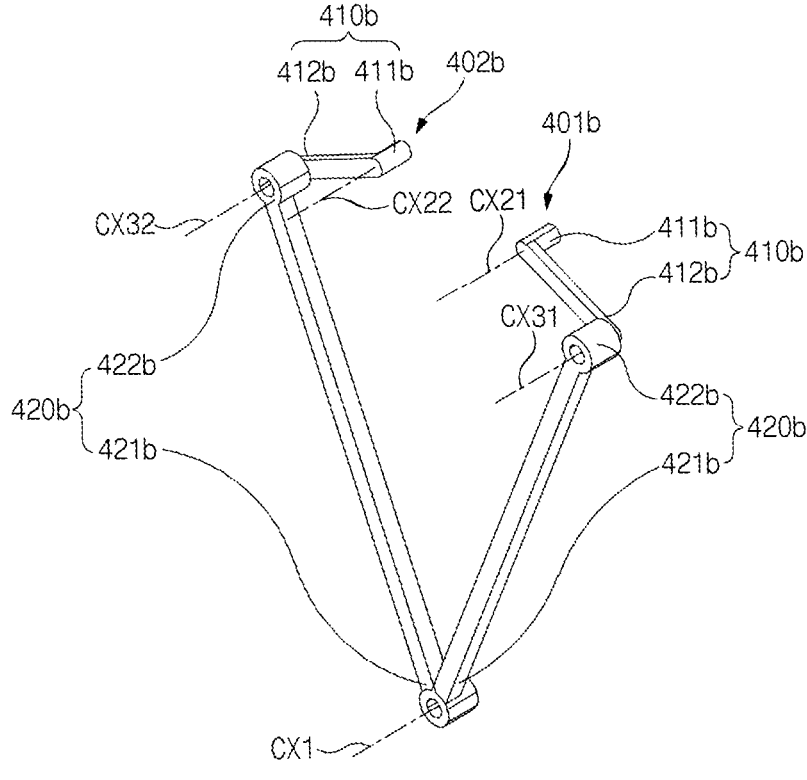
FIG. 13 is a perspective view of a variable driving part according to a second implementation of the present disclosure.
Figure 14:
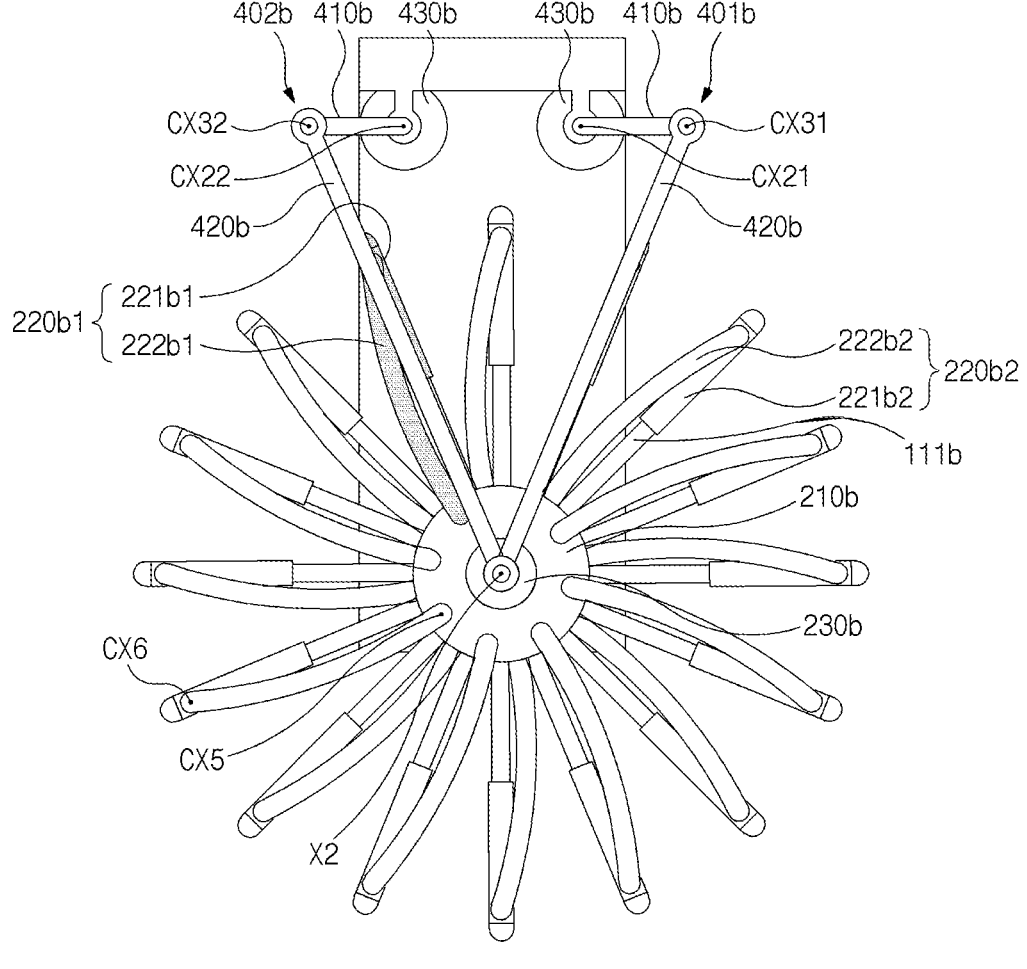
FIG. 14 is a front view of a wheel assembly when a variable driving part is in an overlapping state according to a second implementation of the present disclosure.
Figure 15:
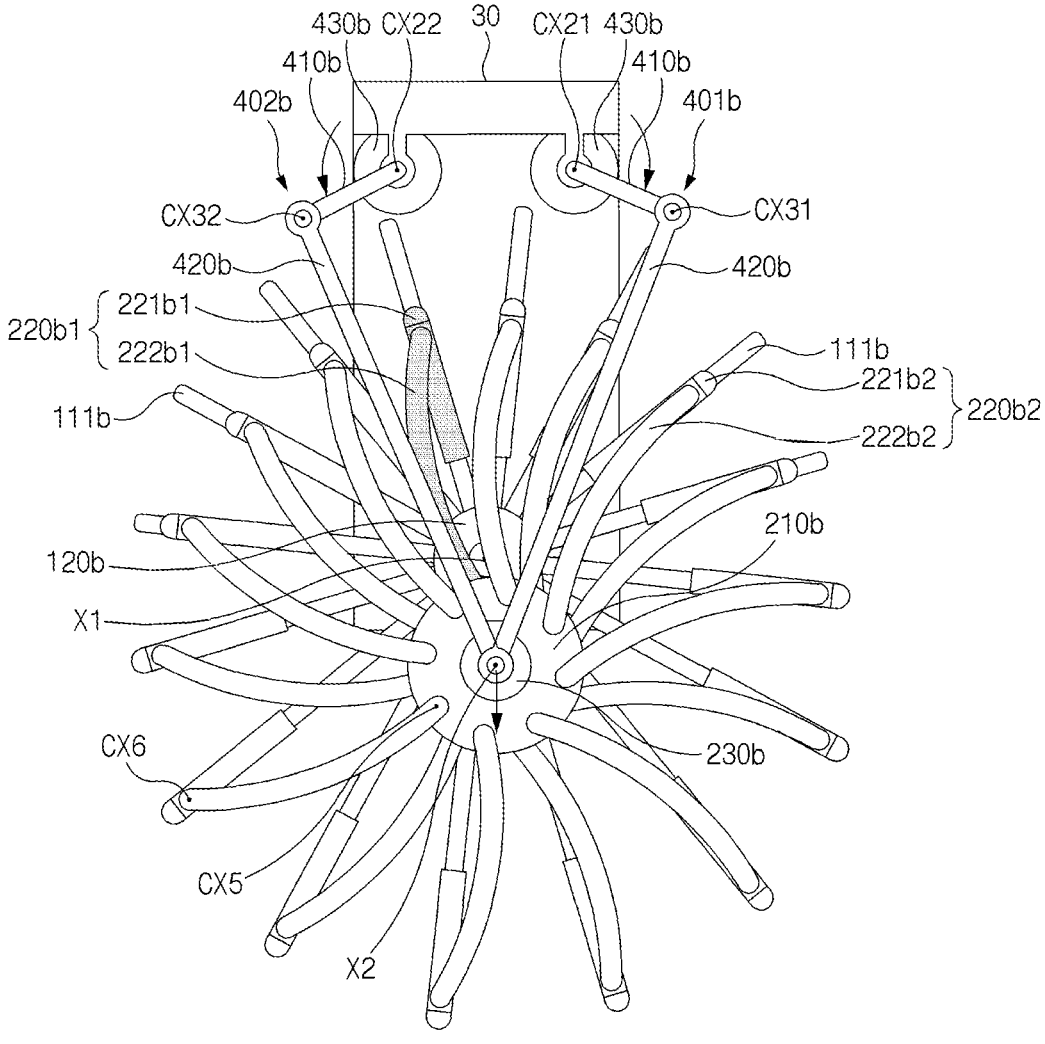
FIG. 15 is a view illustrating a state, in which the variable rotation part of FIG. 14 is moved relative to the driving rotation part.
Figure 16:
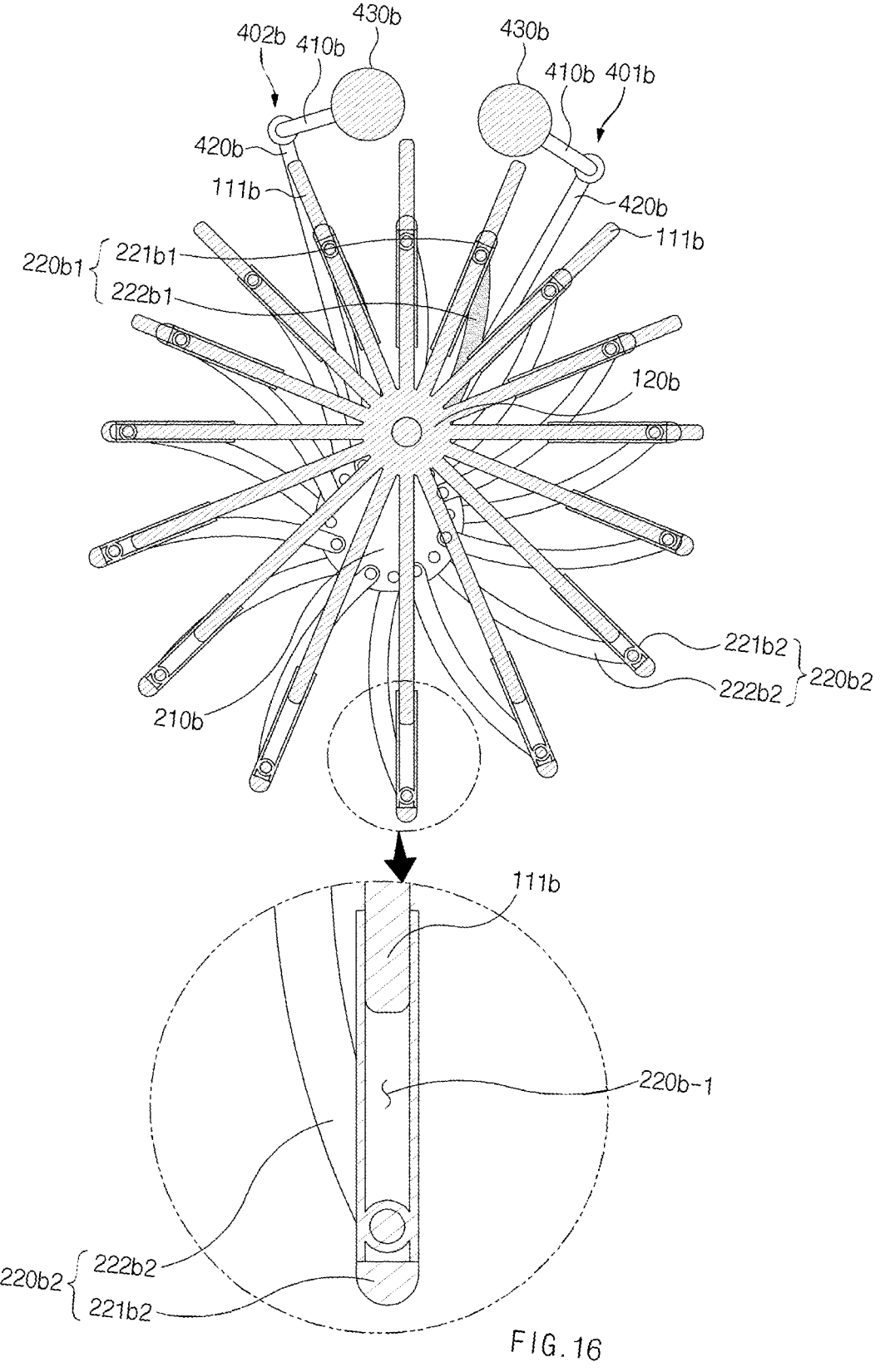
FIG. 16 is a longitudinal sectional view taken along line B-B' of FIG. 9.

Referring to FIG. 12, the variable rotation part 200b may include a variable disk 210b, a cylinder unit 220b, and the power transmission part 230b. A description of the variable disk 210b will be replaced by the description of the variable disk 210a described in the first implementation.

The cylinder unit 220b may be connected to the variable disk 210b. The cylinder unit 220b may be connected to a periphery of the variable disk 210b. Furthermore, a plurality of cylinder units 220b may be provided. The plurality of cylinder units 220*b* may be arranged at the periphery of the variable disk 210*b* to be spaced apart from each other along the variable circumferential direction C2. The variable circumferential direction C2 may be defined as a direction, in which the variable rotation part 200*a* is rotated. For example, the plurality of cylinder units 220*b* may be alternately arranged at a periphery of the outer surface and a periphery of the inner surface of the variable disk 210*b*. For example, when any one of the plurality of cylinder units 220*b* is disposed at a periphery of the outer surface of the variable disk 210*b*, a cylinder unit 220*b* that is closest to the any one of the plurality of cylinder units 220*b* may be disposed at a periphery of an inner surface of the variable disk 210*b*. The plurality of cylinder units 220*b* may include a first cylinder unit 220*b*1 and a second cylinder unit 220*b*2.

The first cylinder unit 220*b*1 may be connected to the variable disk 210*b* to be fixed. One first cylinder unit 220*b*1 may be provided. The first cylinder unit 220*b*1, for example, may be integrally formed with the variable disk 210*b*. Furthermore, the second cylinder unit 220*b*2 may be connected to the variable disk 210*b* to be rotatable. One second cylinder unit 220*b*2 may be provided.

Furthermore, each of the plurality of cylinder units 220*b* may include the cylinder 221*b* and a cylinder link 222*b*.

A cylinder hole 222*b*-1 may be formed in the cylinder 221*b*. The spoke 111*b* may be inserted into the cylinder hole 222*b*-1. The cylinder 221*b* may have a shape that surrounds the spoke 111*b* inserted into the cylinder hole 222*b*-1. The cylinder 221*b* may be moved with respect to the spoke 111*b* along the driving radial direction R1 while surrounding the spoke 111*b*. The cylinder 221*b* may reciprocate in the driving radial direction R1 with respect to the spoke 111*b*. For example, the cylinder 221*b* may be moved inwards in the driving radial direction R1 with respect to the spoke 111*b* or may be moved outwards in the driving radial direction R1.

The cylinder 221*b* may be connected to the cylinder link 222*b* to be rotatable. For example, the cylinder 221*b* and the cylinder link 222*b* may be rotated with respect to each other. In a more detailed example, the cylinder 221*b* may be rotated about a cylinder rotation center CX6. The cylinder rotation center CX6 may be defined as an imaginary rotation center that extends in one direction in an area, in which the cylinder 221*b* and the cylinder link 222*b* are connected to each other.

The cylinder 221*b* may include a first cylinder 221*b*1 and a second cylinder 221*b*2. The first cylinder 221*b*1 may be provided in the first cylinder unit 220*b*1. Furthermore, the second cylinder 221*b*2 may be provided in the second cylinder unit 220*b*2. A description of the first cylinder 221*b*1 and the second cylinder 221*b*2 will be replaced by the description of the cylinder 221*b*.

The cylinder link 222*b* may connect the variable disk 210*b* and the cylinder 221*b*. For example, one end of the cylinder link 222*b* may be connected to the variable disk 210*b*, and an opposite end thereof may be connected to the cylinder 221*b* to be rotatable. The cylinder link 222*b* may include a first cylinder link 222*b*1 and a second cylinder link 222*b*2.

One end of the first cylinder link 222*b*1 may be connected to a periphery of the variable disk 210*b* to be fixed. An opposite end of the first cylinder link 222*b*1 may be connected to the first cylinder 221*b*1 to be rotatable. One end of the first cylinder link 222*b*1 may be rotated about the cylinder rotation center CX6.

One end of the second cylinder link 222*b*2 may be connected to a periphery of the variable disk 210*b* to be rotatable. An opposite end of the second cylinder link 222*b*2 may be rotated about the disk rotation center CX5. Furthermore, an opposite end of the second cylinder link 222*b*2 may be connected to the second cylinder 221*b*2 to be rotatable. An opposite end of the second cylinder link 222*b*2 may be rotated about the cylinder rotation center CX6.

The power transmission part 230*b* may be connected to an outer surface of the variable disk 210*b*. A third end 421*b* and a fourth end 422*b*, which will be described below, may be connected to an outer side of the power transmission part 230*b* in one direction. When the power transmission part 230*b* is viewed in the one direction, an outer side of the power transmission part 230*b* in the one direction may be defined as a part of the power transmission part 230*b*, which faces an outer side of the robot 1.

The rotation driving part 300*b* may include a rotation motor and a rotation member 320*b*. The rotation member 320*b* may be rotated about the driving rotation axis X1 when the rotation motor of the rotation driving part 300*b* is driven. The rotation member 320*b* may be connected to an inner surface of the driving body 120*b*. Furthermore, the inner surface of the driving body 120*b* may be defined as a part of the driving body 120*b*, which faces the driving rotation part 100*b* when the driving body 120*b* is viewed in the one direction.

Referring to FIGS. 13 to 16, the variable driving part 400*b* may include a first variable link 410*b*, a second variable link 420*b*, and the variable motor 430. Furthermore, the first variable link 410*b* may include a first end 411*b* and a second end 412*b*. Furthermore, the second variable link 420*b* may include the third end 421*b* and the fourth end 422*b*. Furthermore, the first variable link 410*b* and the second variable link 420*b* may be disposed on an outer side of the driving rotation part 100*b* in the one direction. The outer side in the one direction may be defined as a direction that faces an outer side of the robot 1.

Furthermore, the first end 411*b* may have a shape that protrudes inwards in the one direction. The inner side in the one direction may mean an opposite side to the outer side in the one direction. Furthermore, the second end 412*b* may have a shape that protrudes outwards in the one direction. For example, an inner end of the first end 411*b* in the one direction and an outer end of the second end 412*b* in the one direction may be spaced apart from each other along the one direction. Furthermore, the third end 421*b* and the fourth end 422*b* may be disposed on an outer side of the variable disk 210*b* in the one direction. In other words, the second variable link 420*b* may be disposed on an outer side of the variable disk 210*b* in the one direction.

A description related to connection relationships and rotations of the first end 411*b*, the second end 412*b*, the third end 421*b*, and the fourth end 422*b*, except for the features of the first end 411*b*, the second end 412*b*, the third end 421*b*, and the fourth end 422*b*, will be replaced by the description related to the first end 411*a*, the second end 412*a*, the third end 421*a*, and the fourth end 422*a* according to the first implementation.

Furthermore, a plurality of variable driving parts 400*b* may be provided. The plurality of variable driving parts 400*b* may include a first variable driving part 401*b* and a second variable driving part 402*b*. A description of the first variable driving part 401*b* and the second variable driving part 402*b* will be replaced by the description of the first variable driving part 401*a* and the second variable driving part 402*a* according to the first implementation.

Hereinafter, a method for overcome an obstacle by the robot 1 according to the second implementation of the present disclosure will be described with reference to FIG. 17.

Figure 17:
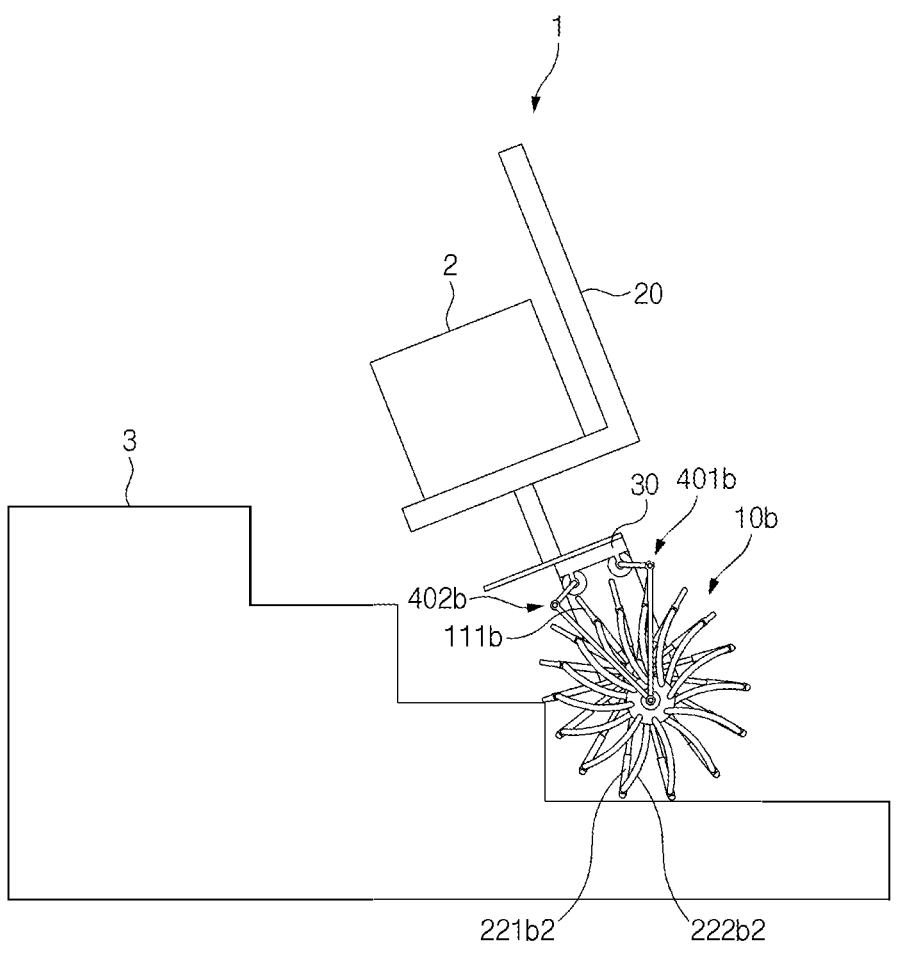
FIG. 17 is a view of a use state of a robot according to a second implementation of the present disclosure.

Referring to FIG. 17, the robot 1 may smoothly pass through a stair 3 having a step while an object 2 is seated on the seat 20. For example, the robot 1 may be driven such that the variable rotation part 200*b* is in a spaced state to pass through the stair 3 having the step. In a more detailed example, according to the robot 1, the first variable driving part 401 and the second variable driving part 402 may be driven such that the spoke 111*b* protrudes from the cylinder 221*b* to an outer side in the driving radial direction R1. As the protruding spoke 111*b* presses an upper surface of the step of the stair 3, the robot 1 ascends over the step. Through the process, the robot 1 may pass through the obstacle, such as the stair 3 having the step.

According to the wheel assembly of the present disclosure, a rapid travel on a flat ground surface may be allowed and a walk for easy passing of an obstacle also may be allowed.

Although it may have been described until now that all the components constituting the implementations of the present disclosure are coupled to one or coupled to be operated, the present disclosure is not essentially limited to the implementations. That is, without departing from the purpose of the present disclosure, all the components may be selectively coupled into one or more components to be operated. Furthermore, because the terms, such as "comprising", "including", or "having" may mean that the corresponding component may be included unless there is a specially contradictory description, it should be construed that another component is not extruded but may be further included. In addition, unless defined otherwise, all terms used herein, including technical or scientific terms, have the same meanings as those generally understood by those skilled in the art to which the present disclosure pertains. The terms, such as the terms defined in dictionaries, which are generally used, should be construed to coincide with the context meanings of the related technologies, and are not construed as ideal or excessively formal meanings unless explicitly defined in the present disclosure.

The above description is a simple exemplification of the technical spirits of the present disclosure, and the present disclosure may be variously corrected and modified by those skilled in the art to which the present disclosure pertains without departing from the essential features of the present disclosure. Accordingly, the implementations disclosed in the present disclosure is not provided to limit the technical spirits of the present disclosure but provided to describe the present disclosure, and the scope of the technical spirits of the present disclosure is not limited by the implementations. Accordingly, the technical scope of the present disclosure should be construed by the attached claims, and all the technical spirits within the equivalent ranges fall within the scope of the present disclosure.

What is claimed is:

1. A wheel assembly comprising:
a driving rotation part configured to rotate about a driving rotation axis that is a rotation axis that extends in a first direction;
a variable rotation part configured to rotate about a variable rotation axis that is variable relative to the driving rotation axis, the variable rotation part being movable relative to the driving rotation part along a direction that is not parallel to the first direction, wherein the variable rotation part is movable relative to the driving rotation part along a relative movement direction that intersects the first direction;
a rotation driving part configured to rotate the driving rotation part along the driving rotation axis; and
a variable driving part configured to move the variable rotation part relative to the driving rotation part along the relative movement direction,
wherein the variable rotation axis is configured to, based on the variable rotation part moving relative to the driving rotation part, vary relative to the driving rotation axis, and
wherein the variable driving part includes:
a first variable driving part and a second variable driving part that are configured to be driven independently from each other, wherein locations of the first variable driving part and the second variable driving part are fixed relative to the rotation driving part.

2. The wheel assembly of claim 1, wherein the variable rotation axis extends along the first direction and is configured to overlap the driving rotation axis or to be spaced apart from the driving rotation axis.

3. The wheel assembly of claim 1, wherein the variable rotation part includes:
a power transmission part defining the variable rotation axis and configured to receive power from the variable driving part,
wherein the variable driving part includes:
a variable motor configured to provide a motor rotation axis that extends in the first direction,
a first variable link connected to the variable motor and configured to rotate, and
a second variable link connected to the power transmission part and configured to rotate, and
wherein the first variable link and the second variable link are connected to each other and configured to rotate relative to each other.

4. The wheel assembly of claim 3, wherein the first variable link includes:
a first end being rotatable about the motor rotation axis based on the variable motor being driven; and
a second end being rotatable about a motor rotation center that extends along the motor rotation axis,
wherein the second variable link includes:
a third end being rotatable about the variable rotation axis based on the variable rotation part being moved relative to the driving rotation part; and
a fourth end connected to the second end and configured to rotate relative to the second end, the fourth end being rotatable about a variable rotation center that extends along the variable rotation axis, and
wherein the first end and the third end are rotatable relative to each other about an end rotation center that extends in the first direction at an area in which the second end and the fourth end are connected to each other.

5. A wheel assembly comprising:
a driving rotation part configured to rotate about a driving rotation axis that is a rotation axis that extends in a first direction; and
a variable rotation part configured to rotate about a variable rotation axis that is variable relative to the driving rotation axis, the variable rotation part being movable relative to the driving rotation part along a direction that is not parallel to the first direction, wherein the variable rotation axis is configured to, based on the variable rotation part moving relative to the driving rotation part, vary relative to the driving rotation axis, wherein the driving rotation part includes:

a guide unit extending in a driving radial direction that is perpendicular to the driving rotation axis, the guide unit being configured to guide movement of the variable rotation part along the driving radial direction based on the variable rotation part being moved relative to the driving rotation part, wherein the variable rotation part includes:

a variable disk being rotatable about the variable rotation axis, and a spoke unit connected to the variable disk, wherein the guide unit includes a cylinder having a cylinder hole, the cylinder hole extending in the driving radial direction and being configured to receive the spoke unit, wherein the spoke unit is configured to be moved along the cylinder hole with respect to the cylinder based on the variable rotation part being moved relative to the driving rotation part, wherein the spoke unit includes a plurality of spoke units that are arranged in the variable disk along a variable circumferential direction in which the variable disk is rotated, wherein the driving rotation part further includes an outer ring part having an annular shape that surrounds the driving rotation axis, wherein a plurality of cylinders are provided at an inner peripheral surface of the outer ring part and arranged along a driving circumferential direction in which the driving rotation part is rotated, wherein at least one of the plurality of spoke units is configured to, based on the variable rotation part being in a spacing state, protrude from the outer ring part to an outer side in the driving radial direction, and wherein the variable rotation axis and the driving rotation axis are spaced apart from each other in the spacing state.

6. The wheel assembly of claim 5, wherein the plurality of cylinders are arranged along the driving circumferential direction such that a cylinder circumferential angle is defined between two adjacent cylinders of the plurality of cylinders, and wherein a spoke circumferential angle that is defined by outer ends of two adjacent spoke units of the plurality of spoke units in a variable radial direction is the same as the cylinder circumferential angle, the variable radial direction being perpendicular to the variable rotation axis.

7. The wheel assembly of claim 5, wherein the spoke unit includes:

a spoke inserted into the cylinder hole and being movable in the driving radial direction relative to the cylinder; and a spoke link having one end connected to the variable disk and an opposite end connected to the spoke, the spoke link being configured to rotate.

8. The wheel assembly of claim 7, wherein the plurality of spoke units include a first spoke unit and a second spoke unit, wherein one end of a first spoke link of the first spoke unit is fixed to the variable disk, and wherein one end of a second spoke link of the second spoke unit is connected to the variable disk and configured to rotate.

9. The wheel assembly of claim 8, wherein the first spoke unit is provided as a single first spoke unit, and wherein the second spoke unit is provided as a plurality of second spoke units.

10. A wheel assembly comprising:

a driving rotation part configured to rotate about a driving rotation axis that is a rotation axis that extends in a first direction; and a variable rotation part configured to rotate about a variable rotation axis that is variable relative to the driving rotation axis, the variable rotation part being movable relative to the driving rotation part along a direction that is not parallel to the first direction, wherein the variable rotation axis is configured to, based on the variable rotation part moving relative to the driving rotation part, vary relative to the driving rotation axis, wherein the driving rotation part includes:

a guide unit extending in a driving radial direction that is perpendicular to the driving rotation axis, the guide unit being configured to guide movement of the variable rotation part along the driving radial direction based on the variable rotation part being moved relative to the driving rotation part, wherein the driving rotation part further includes a driving body being rotatable about the driving rotation axis, wherein the guide unit includes a spoke connected to the driving body and extending along the driving radial direction, wherein the variable rotation part includes a variable disk being rotatable about the variable rotation axis and a cylinder unit connected to the variable disk, wherein the cylinder unit includes a cylinder having a cylinder hole, the cylinder hole extending in the driving radial direction and being configured to receive the spoke, and wherein the cylinder is configured to be moved along the driving radial direction with respect to the spoke based on the variable rotation part being moved relative to the driving rotation part.

11. The wheel assembly of claim 10, wherein the cylinder includes a plurality of cylinders that are arranged in the variable disk along a variable circumferential direction in which the variable disk is rotated, and wherein a plurality of spokes are provided at an outer peripheral surface of the driving body and arranged along a driving circumferential direction in which the driving rotation part is rotated.

12. The wheel assembly of claim 10, wherein the cylinder unit further includes:

a cylinder link having one end connected to the variable disk and an opposite end connected to the cylinder, the cylinder link being configured to rotate.

13. The wheel assembly of claim 12, wherein the cylinder unit includes a plurality of cylinder units, wherein the plurality of cylinder units include a first cylinder unit and a second cylinder unit, wherein one end of a first cylinder link of the first cylinder unit is fixed to the variable disk, and wherein one end of a second cylinder link of the second cylinder unit is connected to the variable disk and configured to rotate.

14. The wheel assembly of claim 13, wherein the first cylinder unit is provided as a single first cylinder unit, and wherein the second cylinder unit is provided as a plurality of second cylinder units.

* * * * *